United States Patent
Gao et al.

(10) Patent No.: US 12,465,990 B2
(45) Date of Patent: Nov. 11, 2025

(54) ARC WELDING METHOD, AND METHOD FOR INSPECTING WELDING STRENGTH OF JOINT WELDED USING ARC WELDING METHOD

(71) Applicant: Nissan Motor Co., Ltd., Yokohama (JP)

(72) Inventors: Li Gao, Kanagawa (JP); Youichi Mori, Kanagawa (JP); Mitsuo Ichikawa, Kanagawa (JP); Shintaro Nonaka, Kanagawa (JP); Yuji Hamaguchi, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 18/865,806

(22) PCT Filed: Jun. 27, 2022

(86) PCT No.: PCT/JP2022/025596
§ 371 (c)(1),
(2) Date: Nov. 14, 2024

(87) PCT Pub. No.: WO2024/003992
PCT Pub. Date: Jan. 4, 2024

(65) Prior Publication Data
US 2025/0256343 A1    Aug. 14, 2025

(51) Int. Cl.
*B23K 9/007* (2006.01)
*B23K 9/00* (2006.01)
(Continued)

(52) U.S. Cl.
CPC ............... *B23K 9/007* (2013.01); *B23K 9/00* (2013.01); *B23K 9/02* (2013.01); *B23K 9/235* (2013.01);
(Continued)

(58) Field of Classification Search
CPC . B23K 9/007; B23K 9/02; B23K 9/00; B23K 9/235; B23K 31/125;
(Continued)

(56) References Cited

U.S. PATENT DOCUMENTS

2022/0010828 A1* 1/2022 Fujiwara ................. B23K 9/02
2024/0342816 A1* 10/2024 Toda ...................... B23K 9/173

FOREIGN PATENT DOCUMENTS

CN        113710401 A     11/2021
JP        H6-39542 A      2/1994
(Continued)

OTHER PUBLICATIONS

Machine English translation of JP-2015131318-A (Year: 2015).*
(Continued)

*Primary Examiner* — Steven W Crabb
*Assistant Examiner* — Fahmida Ferdousi
(74) *Attorney, Agent, or Firm* — GLOBAL IP COUNSELORS, LLP

(57) ABSTRACT

An arc welding method melts and joins at least a part of a workpiece having a plurality of overlapping non-ferrous metal plates. The arc welding method includes forming a machined hole in a welded portion of the workpiece. The machined hole is a non-through-hole that penetrates a non-ferrous metal plate on an arc-radiation side, and reaches a non-ferrous metal plate on a side farthest from an arc welder to form a partial recess portion. The arc welding method further includes causing arc radiation from an opening side of the machined hole to melt and weld a back surface of the non-ferrous metal plate furthest from the workpiece without using a backing jig on an opposite side of the workpiece.

5 Claims, 3 Drawing Sheets

(51) Int. Cl.
*B23K 9/02* (2006.01)
*B23K 9/235* (2006.01)
*B23K 31/12* (2006.01)
*B23K 103/08* (2006.01)
*B23K 103/10* (2006.01)
*B23K 103/14* (2006.01)

(52) U.S. Cl.
CPC ........ *B23K 31/125* (2013.01); *B23K 2103/08* (2018.08); *B23K 2103/10* (2018.08); *B23K 2103/14* (2018.08); *B23K 2103/15* (2018.08)

(58) Field of Classification Search
CPC ............ B23K 2103/08; B23K 2103/10; B23K 2103/14; B23K 2103/15
See application file for complete search history.

(56) References Cited

FOREIGN PATENT DOCUMENTS

| | | | |
|---|---|---|---|
| JP | 2015131318 A | * | 7/2015 |
| JP | 5842734 B2 | * | 1/2016 |
| JP | 2021-37550 A | | 3/2021 |
| WO | 2018/030272 A1 | | 2/2018 |
| WO | 2020/213491 A1 | | 10/2020 |
| WO | 2020/213492 A1 | | 10/2020 |

OTHER PUBLICATIONS

English machine translation of JP-5842734-B2 (Year: 2016).*
First Office Action received for Chinese Application No. 202280097299.X, mailed on Apr. 25, 2025, 5 pages.

* cited by examiner

ARC WELDING METHOD, AND METHOD FOR INSPECTING WELDING STRENGTH OF JOINT WELDED USING ARC WELDING METHOD

CROSS-REFERENCE TO RELATED APPLICATIONS

This application is a U.S. national stage application of International Application No. PCT/JP2022/025596, filed on Jun. 27, 2022.

BACKGROUND

Technical Field

The present invention relates to an arc welding method and a method for inspecting weld strength of a joint welded using the arc welding method, and more specifically to an arc welding method for joining non-ferrous metal plates together and a method for inspecting weld strength of a joint welded using the arc welding method.

Background Information

There are known arc spot welding methods used when joining a plurality of plate materials by welding in which a machined hole is formed in a plate member on an arc-welder side of a workpiece made from overlapping plate members, and joining the plate members by wire-fed arc spot welding.

Japanese Laid-open patent application Ser. No. 06/039,542 (Patent Citation 1) discloses that when arc spot welding is performed by melting an inner wall of a machined hole formed in the above-mentioned plate member, a melt depth in a lower plate member increases and burn-through occurs, so a backing tool is butted against the lower plate member.

SUMMARY

However, in actual production sites, there may be limitations on workpiece shape or on a space on a back side of the workpiece, and it is often not possible to use a backing tool.

The present invention was devised in consideration of such problems associated with the prior art, it being an object of the invention to provide an arc welding method that does not require a backing jig and enables arc spot welding even when there is limited space on the back side of the workpiece.

As a result of earnest research intended to achieve the objective described above, the inventors discovered that the objective described above could be achieved by forming a machined hole not only in a plate member on an arc-welder side but also up to a plate member on a side farthest from the arc welder, thus perfecting the present invention.

Specifically, in the arc welding method of the present invention, at least part of a workpiece made from a plurality of overlapping non-ferrous metal plates is melted and joined. The arc welding method of the present invention is characterized in that the workpiece has a machined hole in a welded portion, the machined hole is a non-through-hole that penetrates a non-ferrous metal plate on an arc-radiation side to reach a non-ferrous metal plate on a side farthest from an arc welder and that is a recess in part of the non-ferrous metal plate, arc radiation is caused from an opening side of the machined hole, and the workpiece is melted and welded up to a back surface of the non-ferrous metal plate on the farthest side without using a backing jig on an opposite side of the workpiece.

In addition, in a weld strength inspection method of the present invention, a weld strength of a joint welded using the arc welding method is inspected. The weld strength inspection method is characterized in that the weld strength is estimated from a diameter of a molten part present on the back surface of the non-ferrous metal plate on the farthest side.

According to the present invention, a machining hole is formed not only in a plate member on an arc-welder side but also up to a plate member on a side farthest from the arc welder; therefore, an arc welding method can be provided with which it is possible to weld without using a backing tool, and also to weld even when there is limited space on a back side of a workpiece.

BRIEF DESCRIPTION OF THE DRAWINGS

Referring now to the attached drawings which form a part of this original disclosure, selected embodiments are illustrated as follows.

DETAILED DESCRIPTION OF EMBODIMENTS

The arc welding method of the present invention shall be described in detail. The arc welding method of the present invention is a welding method in which at least a portion of a workpiece is melted by an arc and a plurality of overlapping non-ferrous metal plates are joined together.

Figure 1:
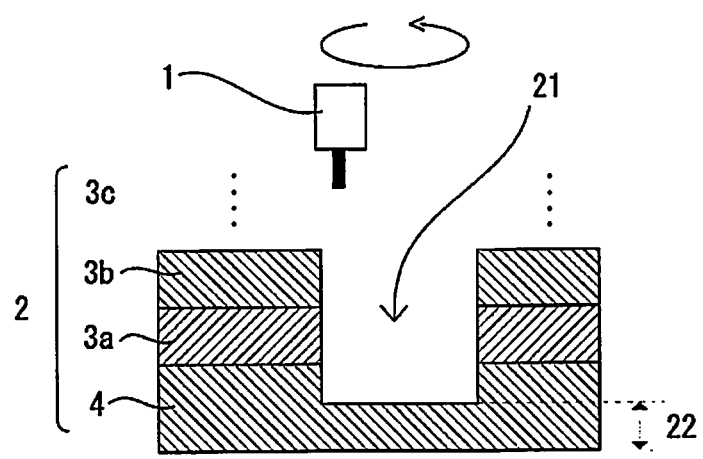
FIG. 1 is a cross-sectional view of a main portion illustrating the arc welding method of the present invention.

A workpiece 2, which is made from a plurality of overlapping non-ferrous metal plates, has a machined hole 21 formed in advance at a welding site. As shown in FIG. 1, the machined hole is a non-through-hole that penetrates all of a non-ferrous metal plate 3 (hereinafter sometimes referred to as the "front plate") that is disposed nearer an arc welder 1 than a non-ferrous metal plate 4 (hereinafter sometimes referred to as the "back plate") that is farthest from the welder, the non-through-hole reaching the back plate 4 and being a recess in part of the back plate 4.

A welding torch is rotated to cause arc radiation from an opening side of the machined hole 21 toward an inner peripheral surface of the machined hole 21, and the inner peripheral surface of the machined hole 21 is melted together with a wire. As a result, a bottom surface of the machined hole 21 melts, and when the melting reaches a back surface of the back plate 4, the arc radiation is stopped to allow solidification, whereby a plurality of overlapping non-ferrous metal plates are joined together. The number of front plates 3 is not limited to one; a plurality of front plates may overlap.

In the arc welding method of the present invention, a machined hole recessed into part of the back plate is formed, whereby the inner peripheral side surface of the machined hole is also formed in the back plate, and the back plate melts together with the front plate, which is adjacent in an in-plane direction of a joining interface. Therefore, the need for a backing tool is eliminated.

In other words, in cases where a back plate is simply joined to an adjacent front plate, regardless of joining strength, the joining interface needs to melt, and if the back plate is not recessed but flat, the back plate cannot melt in the direction of the joining interface unless the bottom of the machined hole melts. Therefore, in order to join a back plate to an adjacent front plate, the back plate needs to first melt in a thickness direction thereof. By contrast, if a portion of the back plate is recessed, the back plate can be melted immediately in the direction of the joining interface, and therefore the back plate can be joined to the adjacent front plate even if the bottom surface of the back plate does not melt.

Thus, the arc welding method of the present invention can be used to melt a workpiece made from overlapping non-ferrous metal plates in the in-plane direction of the joining interface without melting the workpiece in the thickness direction, and the vicinity of the joining interface can therefore be melted early and the back plate and the front plate can be joined before the bottom surface of the machined hole melts through.

Figure 2:
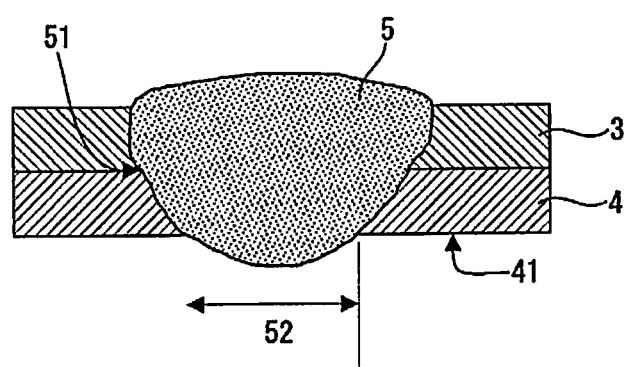
FIG. 2 is a cross-sectional view of a main portion of a joint welded using the arc welding method of the present invention.

As the workpiece is melted in the direction of the joining interface, the workpiece also melts in the thickness direction of the workpiece. By causing arc radiation until the back surface of the back plate melts, the molten portion spreads sufficiently in the in-plane direction of the joining interface as shown in FIG. 2, the machined hole is filled by the molten metal from the welding wire, and joining strength can be ensured by the molten part formed by these parts solidifying.

In addition, since the vicinity of the joining interface can be melted early, welding energy delivered to the workpiece is reduced, and not only can deformation of the workpiece be minimized, but the amount of fumes and dust generated can also be minimized.

FIG. 1 shows an embodiment in which arc radiation is caused from above the machined hole formed in the workpiece to perform welding, but it is also possible to rotate the workpiece 90° to cause the opening of the machined hole to face to the side, and to perform welding by causing arc radiation from the side.

The welding energy inputted to the workpiece depends on a material and thickness of the non-ferrous metal plates as well as a depth and diameter of the machined hole, but it is preferable that the current is 50 to 350 A (amperes) and the energization time is 0.5 to 5 seconds.

If too much welding energy is inputted to the workpiece, the molten metal will drop and separate from the joined portion, the molten part where the molten metal solidifies will decrease in volume, and joining strength will decrease.

The recessed portion of the back plate (where the machined hole is formed) is preferably of a thickness that is greater than 1/20 of the diameter of the machined hole.

Figure 3:
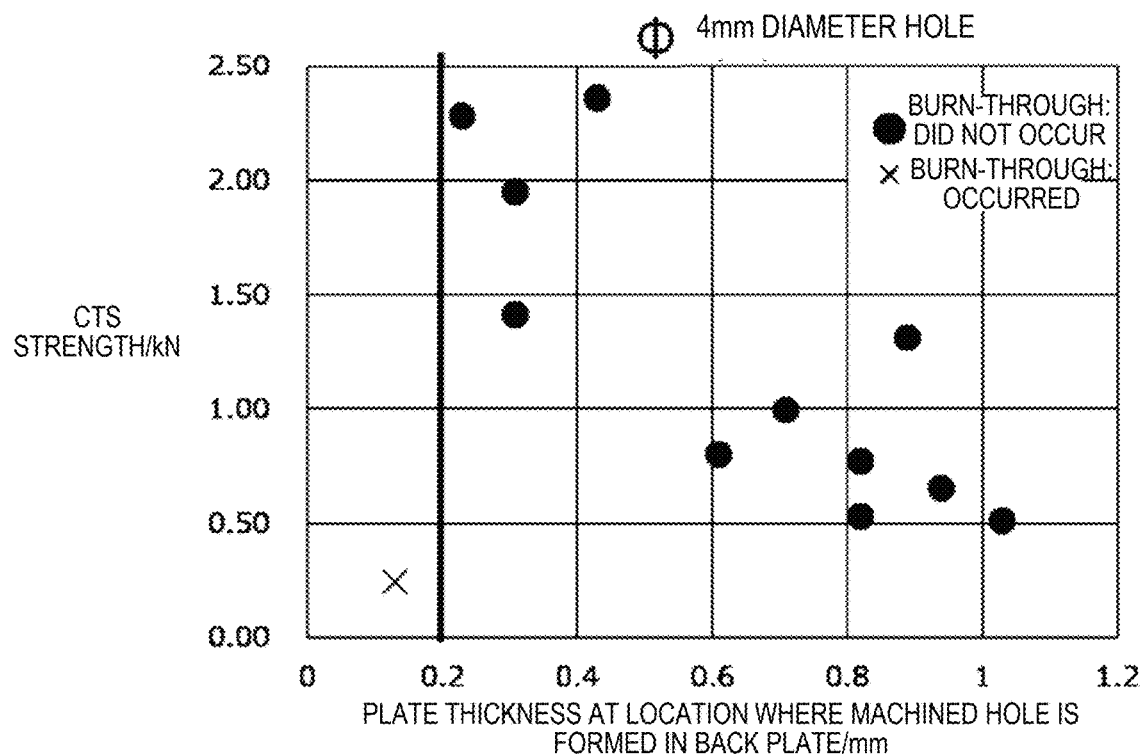
FIG. 3 is a graph of a relationship between plate thickness at a machined hole formation spot in a non-ferrous metal plate on a side farthest from an arc welder and whether or not burn-through occurs in a welded portion, when the machined hole is 4 mm in diameter.
Figure 4:
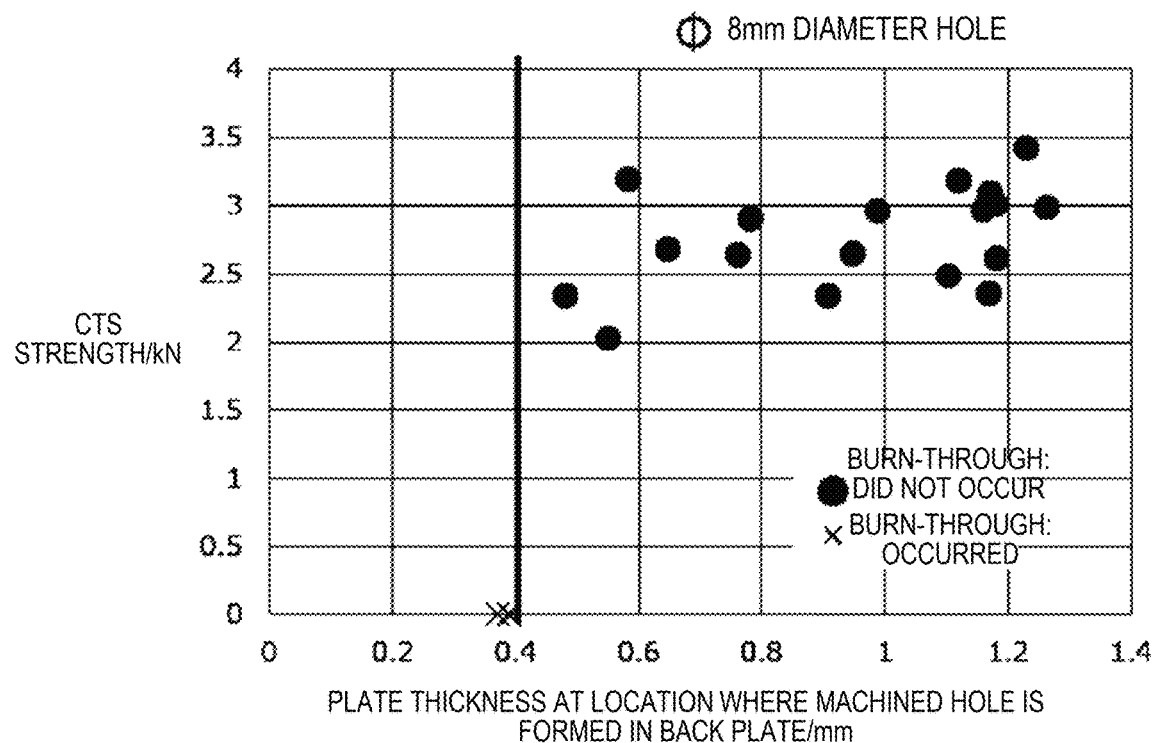
FIG. 4 is a graph of the relationship between plate thickness at the machined hole formation spot in the non-ferrous metal plate on the side farthest from the arc welder and whether or not burn-through occurs in the welded portion, when the machined hole is 8 mm in diameter.

FIG. 3 shows a relationship between the thickness of the back plate at the location where the machined hole is formed and cross tensile strength (CTS) when a 4 mm diameter machined hole is formed in a 5000 series aluminum alloy plate, and FIG. 4 shows the relationship between the thickness of the back plate at the location where the machined hole is formed and cross tensile strength (CTS) when an 8 mm diameter machined hole is formed.

It can be seen from FIGS. 3 and 4 that by making the thickness of the recessed portion of the back plate greater than 1/20 of the diameter of the machined hole, burn-through of the molten metal is prevented and the volume of the molten part is prevented from decreasing.

Furthermore, if the recess formed in the back plate is 0.1 mm or more in depth, the back plate at the joining interface can be melted in the direction of the joining interface.

The above-described machined hole is preferably cylindrical. Due to the inner peripheral surface of the machined hole formed in the front plate adjacent to the back plate being flush with the back plate, the back plate and the front plate can be melted simultaneously at the joining interface of the back plate and the front plate, and the plates therefore melt readily in the direction of the joining interface.

The diameter of the above-described machined hole depends on the required joining strength, but is preferably greater than three times the thickness of the thinnest non-ferrous metal plate among the non-ferrous metal plates constituting the above-described workpiece. If the diameter of the above-described machined hole is smaller than three times the thickness of the thinnest non-ferrous metal plate among the non-ferrous metal plates constituting the above-described workpiece, the volume of the machined hole will be small, so even if the molten metal fills the machined hole, the amount of heat in the metal will be small. As a result, heat will be readily dissipated by the surrounding base material, the plates will not melt readily in the direction of the joining interface, and welding defects such as incomplete welds will occur.

Figure 5:
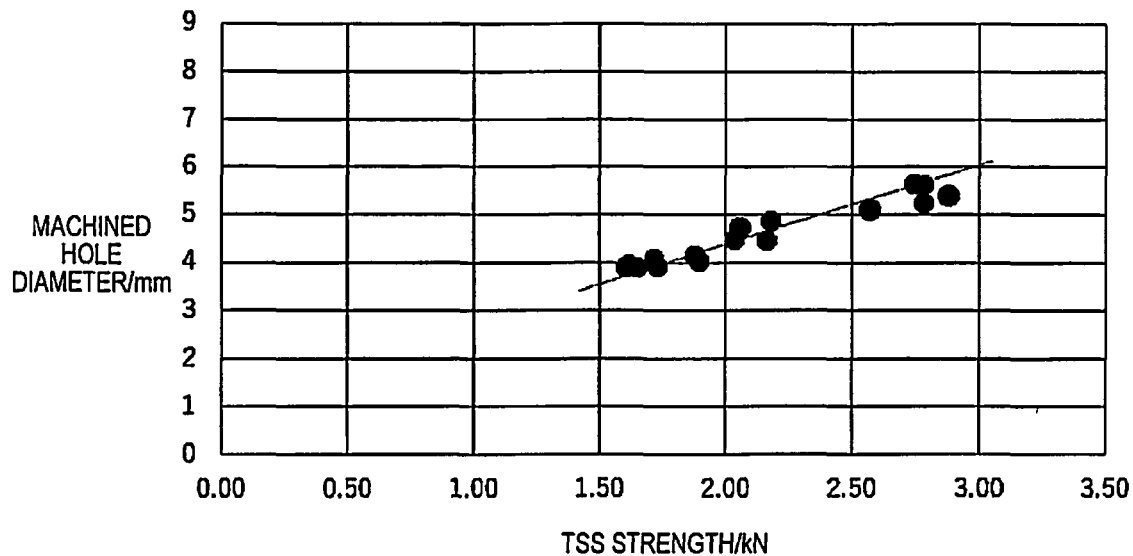
FIG. 5 is a graph of a relationship between machined hole diameter and strength of a molten part formed in a joint.

When a plurality of plates are overlapped and welded together, the weld strength is determined by the weld strength of the thinnest plate, and this weld strength correlates with the diameter of the drilled hole, as shown in FIG. 5.

For example, when the thickness of the thinnest plate member is 1 mm, if the required strength of the product is 2.0 kN, a strength of 2.5 kN or greater can be guaranteed by making the diameter of the machined hole 4.5 mm or greater.

The above-described arc welding method can be applied to the welding of non-ferrous metal plates, and examples of the metals constituting the non-ferrous metal plates include aluminum, magnesium, titanium, and alloys containing these metals.

A method for inspecting the weld strength of a joint welded using the above-described arc welding method of the present invention shall now be described.

Generally, the weld strength of a joint is determined by a diameter of a joining interface 51 of two plate members in a molten part 5; therefore, in order to know the weld strength of the joint, it is necessary to measure the diameter of the joining interface 51 of the molten part 5. However, it is difficult to measure the diameter of the joining interface 51 of the molten part 5 from the outside.

In the arc welding method of the present invention, as described above, the machined hole 21 passing through the joining interface 51 is formed in the welded portion, and an edge of the joining interface 51 is exposed; therefore, the vicinity of the joining interface can be directly melted through the machined hole 21, and the vicinity of the joining interface can be melted without melting the bottom surface of machined hole 21. Therefore, if the molten part 5 is formed up to a back surface 41 of the back plate 4, the diameter of the molten part at the joining interface 51 will be greater than a diameter 52 of the molten part present on the back surface 41.

Therefore, the weld strength of a joint welded using the arc welding method of the present invention can be estimated from the diameter 52 of the molten part present on the back surface 41 of the back plate 4.

Figure 6:
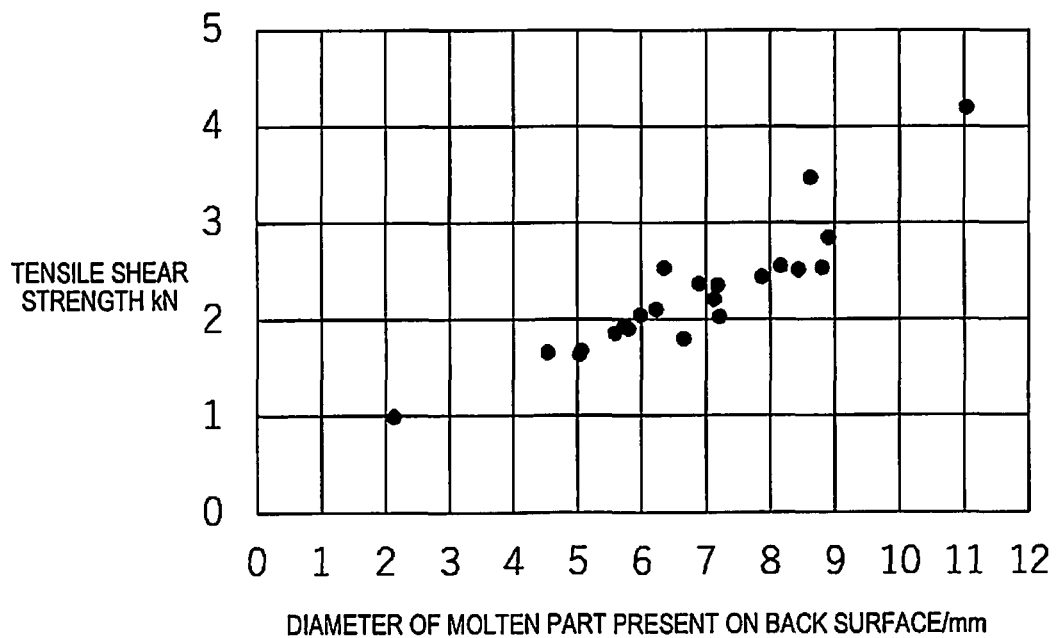
FIG. 6 is a graph of a relationship between tensile shear strength of a joint and a diameter of a molten part present on a back surface of a non-ferrous metal plate on a side farthest from an arc welder.

FIG. 6 shows a relationship between the diameter of the molten part present on the back surface of the back plate and tensile shear strength in a joint welded using the arc welding method of the present invention.

It can be seen from FIG. 6 that there is a correlation between the tensile strength of the joint and the diameter of the molten part present on the back surface of the back plate, and for a joint welded using the arc welding method of the present invention, it is possible to estimate the weld strength of the joint by measuring the diameter of the molten part present on the back surface of the back plate.

Thus, a method for inspecting the weld strength of the joint requires only measuring the diameter of the molten part present on the visible back surface of the back plate, and the weld strength of the joint can be easily estimated; therefore, it is possible to inspect all joints rather than merely conducting a sample inspection.

The invention claimed is:

1. An arc welding method for melting and joining at least a part of a workpiece having a plurality of non-ferrous metal plates that overlap one another, the arc welding method comprising:

forming a machined hole in a first portion of the workpiece, the machined hole being a non-through-hole that penetrates each of the plurality of non-ferrous metal plates except a bottommost non-ferrous metal plate among the plurality of non-ferrous metal plates, the bottommost non-ferrous metal plate being disposed on a side farthest from an arc welder and the non-through-hole including a recess portion formed in a portion of the bottommost non-ferrous metal plate; and forming a weld by causing arc radiation from an opening side of the machined hole to melt a back surface of the bottommost non-ferrous metal plate without using a backing jig on an opposite side of the workpiece.

2. The arc welding method according to claim 1, wherein the machined hole is cylindrical.

3. The arc welding method according to claim 2, wherein the recess portion of the bottommost non-ferrous metal plate has a plate thickness greater than $\frac{1}{20}$ of a diameter of the machined hole.

4. The arc welding method according to claim 3, wherein the diameter of the machined hole is greater than three times a thickness of a thinnest non-ferrous metal plate among the plurality non-ferrous metal plates.

5. A method for inspecting a weld strength of the joint welded using the arc welding method according to claim 1, the weld strength inspection method comprising estimating the weld strength based on a diameter of a molten part present on the back surface of the bottommost non-ferrous metal plate.

* * * * *